(12) United States Patent
Chou (10) Patent No.: US 6,363,320 B1
(45) Date of Patent: Mar. 26, 2002

(54) THIN-CLIENT REAL-TIME INTERPRETIVE OBJECT TRACKING SYSTEM

(75) Inventor: Yue-Hong Chou, Fountain Valley, CA (US)

(73) Assignee: GeoSpatial Technologies Inc., Santa Ana, CA (US)

( * ) Notice: Subject to any disclaimer, the term of this patent is extended or adjusted under 35 U.S.C. 154(b) by 0 days.

(21) Appl. No.: 09/641,302

(22) Filed: Aug. 18, 2000

(51) Int. Cl.[7] .................. G01C 21/00; G08G 1/123; H04B 7/185
(52) U.S. Cl. .................. 701/207; 340/988; 342/357.08
(58) Field of Search .................. 701/200, 205, 701/207–209, 213–215, 225; 340/471–473, 935–936, 944, 988–996; 342/357.09, 357.1, 357.11–357.14, 357.17

(56) References Cited

U.S. PATENT DOCUMENTS

| | | | | |
|---|---|---|---|---|
| 6,133,853 A | * | 10/2000 | Obradovich et al. | 340/905 |
| 6,141,621 A | * | 10/2000 | Piwowarski et al. | 701/207 |
| 6,188,956 B1 | * | 2/2001 | Walters | 701/200 |
| 6,198,390 B1 | * | 3/2001 | Schlager et al. | 340/540 |
| 6,199,010 B1 | * | 3/2001 | Richton | 701/206 |
| 6,202,023 B1 | * | 3/2001 | Hancock et al. | 701/201 |
| 6,212,472 B1 | * | 4/2001 | Nonaka et al. | 701/208 |
| 6,212,474 B1 | * | 4/2001 | Fowler et al. | 701/211 |
| 6,226,590 B1 | * | 5/2001 | Fukaya et al. | 701/209 |
| 6,236,358 B1 | * | 5/2001 | Durst et al. | 342/357.09 |

* cited by examiner

Primary Examiner—William A. Cuchlinski, Jr.
Assistant Examiner—Thu Nguyen
(74) Attorney, Agent, or Firm—Sheldon & Mak (57) ABSTRACT

A system for tracking objects includes a database for storing reference data as line segments corresponding to coordinate locations along environmental reference features; mobile units for connection to the objects for receiving coordinate object target point locations, and having means for receiving signals from an external location system and for generating the object data, and a wireless object data transmitter; and a computer having access to the database and to the object data, and generating an interpreted location of each of the objects in terms relative to automatically selected ones of the reference features. Also disclosed is a method for tracking the objects. Further disclosed is a computer program embodied on a computer-readable medium and having code segments for tracking objects according to the method.

22 Claims, 5 Drawing Sheets

THIN-CLIENT REAL-TIME INTERPRETIVE OBJECT TRACKING SYSTEM

BACKGROUND

The present invention relates to computer-based locating and tracking of objects such as vehicles, vessels, aircraft, bicycles, animals, and containers.

Automatic Vehicle Location System (AVL) has been a known technology since the completion of the NAVSTAR Global Positioning System (GPS) by the US Department of Defense. A typical AVL consists of (1) one or more mobile units, (2) one or more vehicle monitoring stations, and (3) a wireless communication network. A mobile unit is a piece of hardware with a GPS receiver and a wireless transmitter installed in a vehicle. A vehicle monitoring station has the computer equipment to process GPS data and monitor vehicle locations. The wireless communication network is used to send vehicle GPS data from a mobile unit to a monitoring station.

Location information of any object can be obtained from a GPS receiver or other terrestrial location-detection device. The location information is typically represented by either latitude/longitude (denoted as lat/long in the GIS and mapping industry), or a pair of x and y coordinates using any local referencing system (denoted as x-y). In addition to lat/long or x-y, additional information about any object can include speed, direction of movement if the object is moving, and elevation. Furthermore, each location record can be associated with the time and date the object location was recorded.

The location information obtained from the object is typically transmitted through a wireless communication network to a centralized location for data processing. Such a location is usually called the AVL Host, Data Processing Center, or Data Processing Station, where AVL stands for Automatic Vehicle Location system. A Host and one or more Mobile Units are equipped with the location-detection device. The usual systems of the prior art handle location information by displaying the location of the Mobile Unit on a digital map in the same coordinate system (lat/long or x-y) as a dot. An operator interprets the location by referencing surrounding features on the map, such as streets, landmarks, buildings, parks, etc. Translation of the point location of the object into a more useful expression of map location is thus processed manually by the operator.

Major limitations of the prior art include:
(1) The Host computer is installed with mapping software to display both the object location and the reference map.
(2) An operator reads the map and translates the location information into other descriptive forms.
(3) If a user of the service desires to know the location of the object being tracked, the operator may verbally describe the location information to the user, or send the user a text file describing the location, or send the user a map in either digital form or hard copy map.
(4) If the user intends to retrieve the location information with a thin client receiver, the choices are quite limited. First, if the user has an analog cellular phone, then the operator must describe the location to the user by voice communication. In this case, sending a text file or a digital map is not an option. A hard copy map is out of question. Second, if the user has a computer of any kind with a modem or Internet connection, then the operator can either send a text file describing the location, or send a digital map showing the location of the object against the referencing map. Third, if the user has a hand-held computer with a modem or other form of wireless communication, then the receiving method could be either a text file or a digital map. Fourth, if the user has a hand-held computer, or a mobile data terminal, then the only option is a text file describing the location of the object. A cellular phone with limited image display capability can also receive a text file as in the fourth case.

The current method thus has the following major constraints:
(1) The process requires manual operations at the Host or the Data Processing Center.
(2) Manually interpreting location information is time consuming and error-prone.
(3) Due to the required manual processing, tracking of objects is not done in real-time.
(4) Because of the above constraints, currently it is not practical to receive location information through thin-clients such as cellular phones or hand-held computers.

Geocoding, also known as address matching, is the process of translating a street address into a set of map coordinates. For example, the input of "1234 Main Street, Columbus," is translated into a pair of Latitude and Longitude readings, or X and Y coordinates, so that the location of that address can be displayed on a map. Reverse Geocoding is opposite to geocoding. It takes a pair of Latitude and Longitude, or X and Y coordinates, and converts the input coordinates into a street address. There are two known methods of reverse geocoding, the Polygon method and the Centroid method. The Centroid method is a revised and enhanced version of the Polygon method.

The Polygon method is based on polygons of a parcel map, i.e., each land record is digitized into a polygon representing the parcel, and the record is associated with a street address. Conceptually, any point location denoted by a pair of Lat/Long or X-Y can be plotted on the parcel map and then the parcel in which the point location falls is identified and the address determined. There are two major problems with the Polygon method. First, parcel maps showing polygon features tend to be excessively large in size even for just a small city. Data processing is extremely difficult due to the file size. As a consequence, the Polygon method is just a concept and is not used practically. Empirical application of this method is limited to small geographic areas. Second, digital parcel maps are expensive to build and are available only in very few cities or counties. Using this method for reverse geocoding is thus feasible in only a very few cases.

The Centroid method is basically a revision of the Polygon method and the enhancement is meant to reduce the file size substantially. Instead of using polygons to represent parcels, the Centroid method organizes land records by the centroid location of each parcel and the centroid point becomes the graphical object in the database. As each polygon is reduced to a point location, the file size is minimized. The search method can be much improved with the Centroid method. In the Polygon method, the program must compare the target point location with polygons. The Centroid method only needs to find the closest centroid point from the target point. The Centroid method still requires a parcel map, and must convert the parcel map into a point coverage of centroid locations, which requires one additional procedure in data preparation. The main problem remains the same, i.e., polygon maps are available only in very few areas. An additional problem is that an incorrect parcel can be associated with the target point location, particularly when the parcel sizes are not uniform.

Both the Polygon method and the Centroid method face major limitations. In practical terms, the required parcel maps are not available in most cities or counties. In terms of methodology, the major limitation is that the information that can be generated from either method is limited to the street address of the best-fit location and is not related to the street network. For instance, the result of one match could be "1234 Main Street, Santa Ana, Calif.". In reality, the point location obtained from GPS satellites is not accurate. At present, after the US government removed the introduced error called Selective Availability (SA) on May 1, 2000, the point is within 10 meters accuracy, meaning that the location could be 10 meters off the actual location. In addition, if the digital map has a 20-meter accuracy, then the worst case position discrepancy could be 30 meters.

Due to the above limitations, the existing methods cannot generate information about street networks. Either method can generate a best-fit address, but it cannot tell us whether the object is between a pair of intersections. Furthermore, the object may be placed at a location on the wrong side of a freeway, i.e., if the object is moving south-bound on a limited access freeway, either method may place it on the north bound lane without knowing whether the match is correct or not.

Thus there is a critical need for a tracking system that can operate in real-time without operator intervention, that can automatically service thin-clients, and that otherwise overcomes the disadvantages of the prior art.

SUMMARY

The present invention meets this need by providing a system and method that is particularly effective in tracking objects in real-time, allowing thin-client receivers, such as cellular phones or hand-held computers, to receive location information of any object being tracked in real-time. In one aspect of the invention, a system for tracking objects in an environment having geographical reference features includes database for storing reference data as line segments corresponding to coordinate locations along the reference features; means for receiving object data including respective target points as coordinate locations of the objects; and a computer having access to the database and to the object data, the computer being programmed for generating an interpreted location of each of the objects in terms relative to automatically selected ones of the reference features.

The means for receiving object data can include a plurality of mobile units for connection to respective ones of the objects, each of the mobile units having means for receiving signals from an external location system and generating the object data, and a wireless transmitter for transmitting the object data over a wireless communication network for access by the computer. The means for receiving signals can include a GPS receiver. The object data can further include a target altitude. The means for receiving signals can include a terrestrial position receiver having access to a terrestrial location system. The object data can further include object identification. The object data can further include a target velocity. The object data can further include a target heading.

The database can be sectioned by geographic unit, the computer being programmed for determining geographic units containing the coordinate locations of the objects and, for each of the objects, accessing a corresponding section of the database. The database sections can include digital street maps, the computer being programmed for determining at least some of the interpreted locations in terms of a closest street, an intersecting street, and a direction on the closest street from the intersecting street. At least some of the interpreted locations can further include a closest location along the closest street. At least some of the interpreted locations can further include a heading and distance from the closest location. The determination of the closest street can be qualified to exclude streets that are inconsistent with a velocity and heading of the object. At least one of the velocity and heading of the object can be determined based on separately received target points of the object and a time interval between the target points.

The system can further include means for temporarily saving segments of excluded streets as reserve segments, means for determining a likelihood of abnormal object movement, and means for restoring the reserve segments as candidate segments following a determination of abnormal object movement. The means for determining abnormal object movement can include means for determining that, for any target point, there are only reserve segments.

In another aspect of the invention, a system for tracking objects in an environment having geographical reference features includes the database for storing reference data corresponding to coordinate locations along the reference features; the means for receiving object data including coordinate locations of the objects; the computer having access to the database and to the object data, the computer being programmed for generating an interpreted location of each of the objects in terms relative to selected ones of the reference features, the interpreted locations being in a plurality of formats selected from the set consisting of text, high-resolution graphics, low-resolution graphics, analog voice, and digital voice; the computer also being interfaced to a data communication network being accessible by network terminals including thin-client receivers; and the computer being further programmed for determining from a requesting network terminal a capability of that terminal for receiving any of the plurality of formats, and automatically transmitting the interpreted location of an identified object in a compatible one of the selected formats.

In a further aspect of the invention, a method for tracking objects in an environment having geographical reference features in terms relative to automatically selected ones of the reference features includes the steps of:

(a) providing a database for storing reference data as line segments corresponding to coordinate locations along the reference features;

(b) receiving object data including a target point as a coordinate location of one of the objects;

(c) defining an initial target zone proximate the target point;

(d) determining whether a predetermined number of the line segments extend within the target zone;

(e) in the absence of the predetermined number, enlarging the target zone and repeating step (d);

(f) identifying as candidate segments the line segments extending within the target zone;

(g) selecting a matching segment from the candidate segments;

(h) calculating a matching point on the matching segment, the matching point being in closest proximity to the object location; and (i) interpreting the object location in terms of the matching segment and the matching point.

The selecting of the matching segment can include exclusion of segments from the candidate segments based on one or more of physical attributes of the reference features represented by the line segments, velocity of the object, heading of the object, a last previously identified matching segment, and previously identified location(s) of the object. The selecting of the matching segment can further include determining a closest segment from remaining candidate segments. The determination of the matching segment can be qualified to exclude segments that are inconsistent with a velocity and heading of the object. The method can further include determining at least one of the velocity and heading of the object based on separately received target points of the object and a time interval between the target points. The method can further include temporarily saving segments of excluded streets as reserve segments, determining a likelihood of abnormal object movement, and restoring the reserve segments as candidate segments following a determination of abnormal object movement. The determination of abnormal object movement can include determining that, for any target point, there are only reserve segments.

The method can further include determining a boundary feature from which to access the matching point, including determining whether the matching segment terminates in an intersection, an end, and/or a continuation segment; for terminations exclusive of intersections and ends, substituting the continuation segment and repeating step (a); and including the end and intersection(s) in the interpreting of the object location. The method can further include monitoring a data communication network; receiving an object location request from a client of the data communication network; automatically identifying a data output capability of the client; automatically selecting an output format for the object location interpretation, the output format being consistent with the data output capability of the client; and transmitting the location interpretation in the selected output format.

The database can be sectioned by geographic unit, the method further including determining geographic units containing the coordinate locations of the objects and, for each of the objects, accessing a corresponding section of the database. The database sections can include digital street maps, the method further including determining at least some of the interpreted locations in terms of a closest street, an intersecting street, and a direction on the closest street from the intersecting street.

In yet another aspect, the invention is embodied in a computer program embodied on a computer-readable medium and having code segments for tracking objects according to the above-described method.

DRAWINGS

These and other features, aspects, and advantages of the present invention will become better understood with reference to the following description, appended claims, and accompanying drawings, where:

DESCRIPTION

Figure 1:
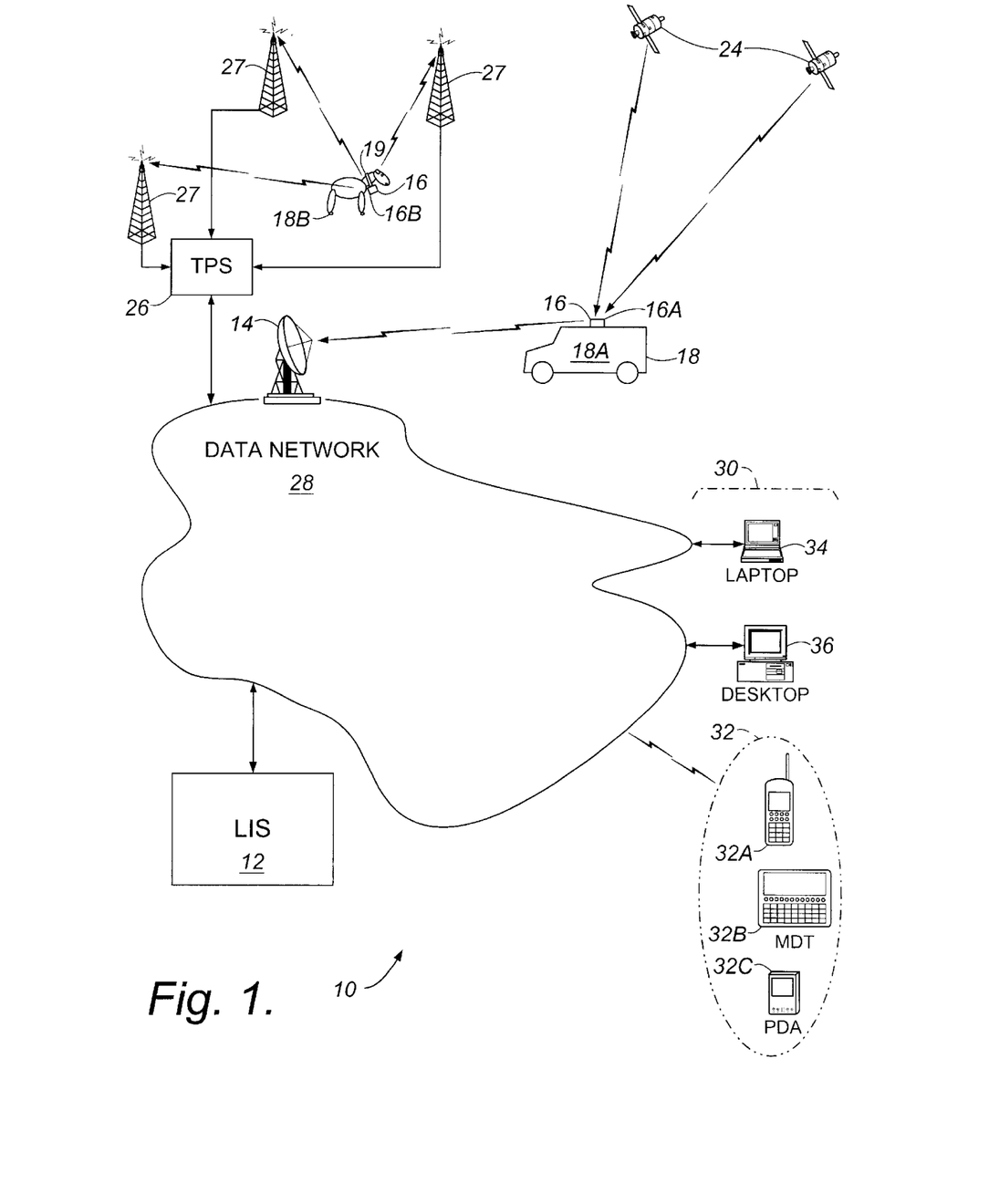
FIG. 1 is a pictorial diagram of a network tracking system according to the present invention.
Figure 2:
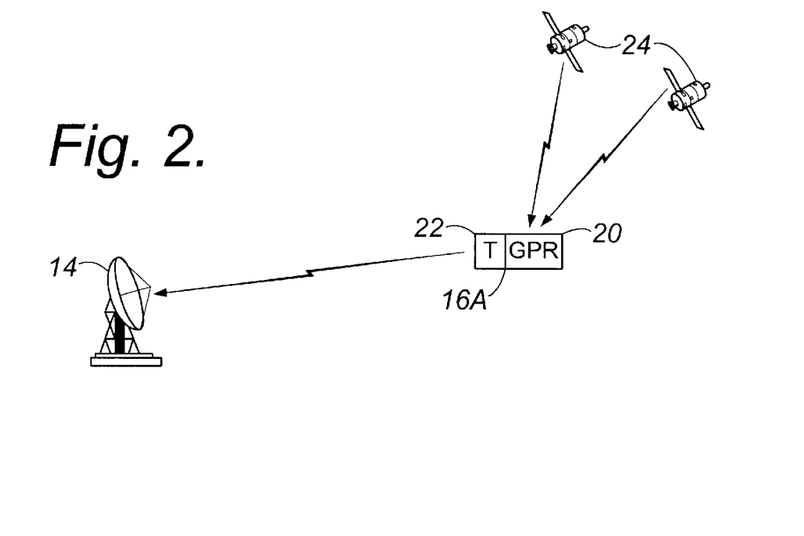
FIG. 2 is a pictorial diagram of a portion of the system of FIG. 1 including features of a mobile unit thereof.

The present invention is directed to a real-time tracking system for movable objects that is particularly effective in permitting acquisition and display of tracking data by a wide variety of network devices including wireless thin-client receivers such as cellular phones, Personal Digital Assistants (PDA's), Auto PC's, and Mobile Data Terminals (MDTs). With reference to FIGS. 1–6 of the drawings, a network tracking system 10 includes a location information server 12 that is connected through a wireless communication network 14 to a plurality of mobile units 16 that are carried by respective objects 18. The objects 18 can be vehicles such as vessels, automobiles, bicycles, and trucks, a service truck 18A being shown in FIG. 1. Other objects 18 can include containers, persons such as children, and animals, one such animal being designated 18B in FIG. 1. The mobile unit carried on the service truck 18A is individually designated 16A, while that carried by the animal 18B is designated 16B, the mobile unit 16B having a collar 19 or other suitable means for securing to the animal 18B. As shown in FIG. 2, one form of the mobile units 16, exemplified in the mobile unit 16A, includes a position receiver 20 and a wireless transmitter 22. The position receiver 20 can be NAVSTAR Global Positioning System (GPS) receiver that is responsive to an array of GPS satellites 24. Alternatively, a terrestrial location detection system such as that designated 26 in FIG. 1 functions as a position receiver. This commercially available technology uses radio signals to locate objects, such as in the LoJack® system. This technology involves triangulation of signals transmitted from the mobile unit 16B and detected by at least three radio receivers 27, the location being estimated from the relative strength of the signals received at the three receivers 27.

The location server (LIS) 12 communicates transformed or interpreted counterparts of received object data through a data communication network 28 to a plurality of network terminals 30. One typical example of such data network is Internet. Other types of data network such as a local area network (LAN), wide area network (WAN), and wireless LAN are also contemplated. As shown in FIG. 1, access to the wireless communication network 14 is also through the data communication network 28. Existing wireless communication networks suitable for use by the present invention include those known as Mobitex of BellSouth and CDPD of AT&T. One important feature of the present invention is that the network terminals 30 can include thin-client receivers 32 as well as conventional devices such as a laptop computer 34 and a desktop computer 36, with the interpreted object data being automatically presented in a form that utilizes the particular capabilities of the particular terminals 30 that receive the data. Thin-client receivers are those have limited text and/or graphics output capability, exemplary devices shown in FIG. 1 being a cellular phone 32A, a mobile data terminal (MDT) 32B, and a handheld computer or personal digital assistant (PDA) 32C. Another and particularly important feature is that the LIS 12 does not require human operators to direct the process of interpreting the received object data.

Figure 3:
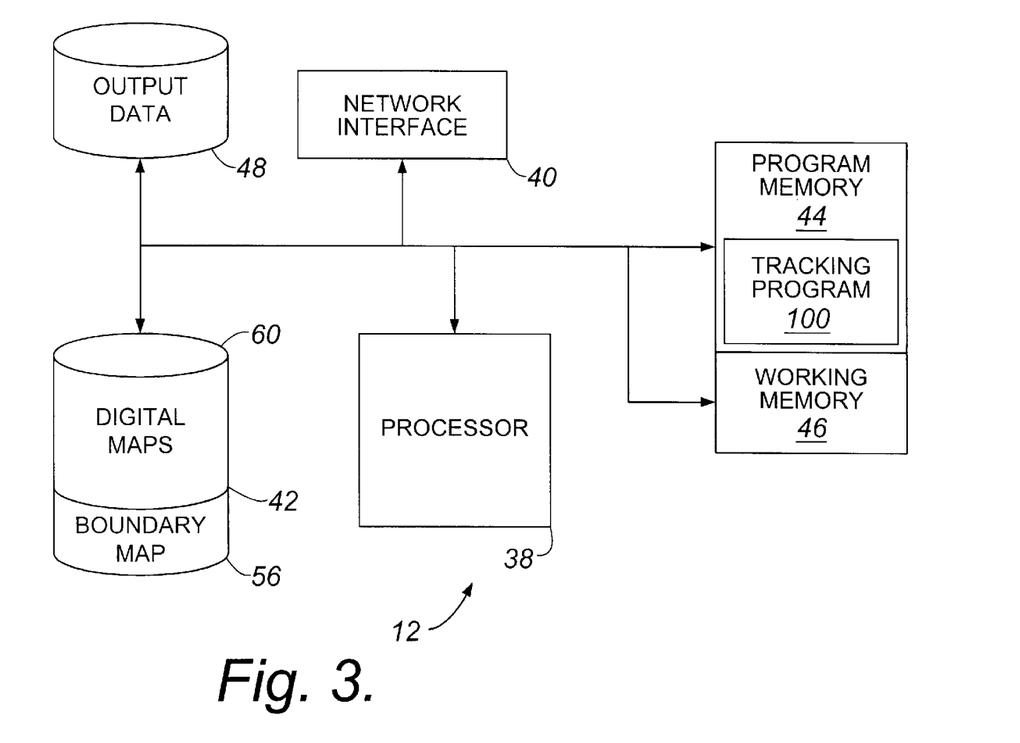
FIG. 3 is a block diagram of a location information server of the system of FIG. 1.

With particular reference to FIG. 3, an exemplary implementation of the LIS 12 is basically a server computer having a processor 38, network interface 40 to the data communication network 28, a mass memory database 42, program memory 44, and working memory 46 in any suitable configuration. One suitable configuration is as a desktop computer having an Intel® Pentium III processor operating at 800 MHZ and having 1GB of random access memory (RAM) and a 100 GB hard disk drive, such being available from a variety of sources. Preferably the network interface 40 has one or more voice modems through either serial ports or USB ports. For data networks such as the Internet, the LIS 12 must also have high speed network access such as ISDN, DSL, or T1, and typically includes an output database 48. It will be understood that the LIS 12 can include a direct interface to the wireless communication network 14, either in place of the network interface 40 or in addition thereto (in which case the networks 14 and 28 can be otherwise independent). The database 42 is loaded by any suitable means with reference data pertaining to reference features within a geographic environment containing the objects 18, at least a portion of the reference data being preferably expressed as a series of line segments such as street centerline geometry.

Such data is provided in a digital street map called a street centerline file, with national coverage in the United States being available through US Census Bureau as public-domain data called the TIGER/Line file. This file contains records of street segments where each record defines a line feature rather than a polygon or a point. There are also numerous vendors that sell digital street maps of similar format, the maps being typically organized by county in the US. Selection of an appropriate county map is facilitated by separately accessing a boundary map of counties. It will be understood that the present invention is contemplated to employ any type of digital street network data and any type of boundary maps such as counties, cities, reporting districts, and boundaries of any type. It is further contemplated that the maps can be in different scales, and that there can be overlapping of map boundaries, in which case an appropriate selection can be made between plural maps containing a particular object location based, for example, on an expected range of travel of that object. Moreover, the reference data as well as the object data can be expressed in terms of a variety of coordinate systems such as Latitude/Longitude and X-Y, with the LIS 12 normally selecting reference data files in correspondence with the coordinate system of the object data.

Figures 4, 5:
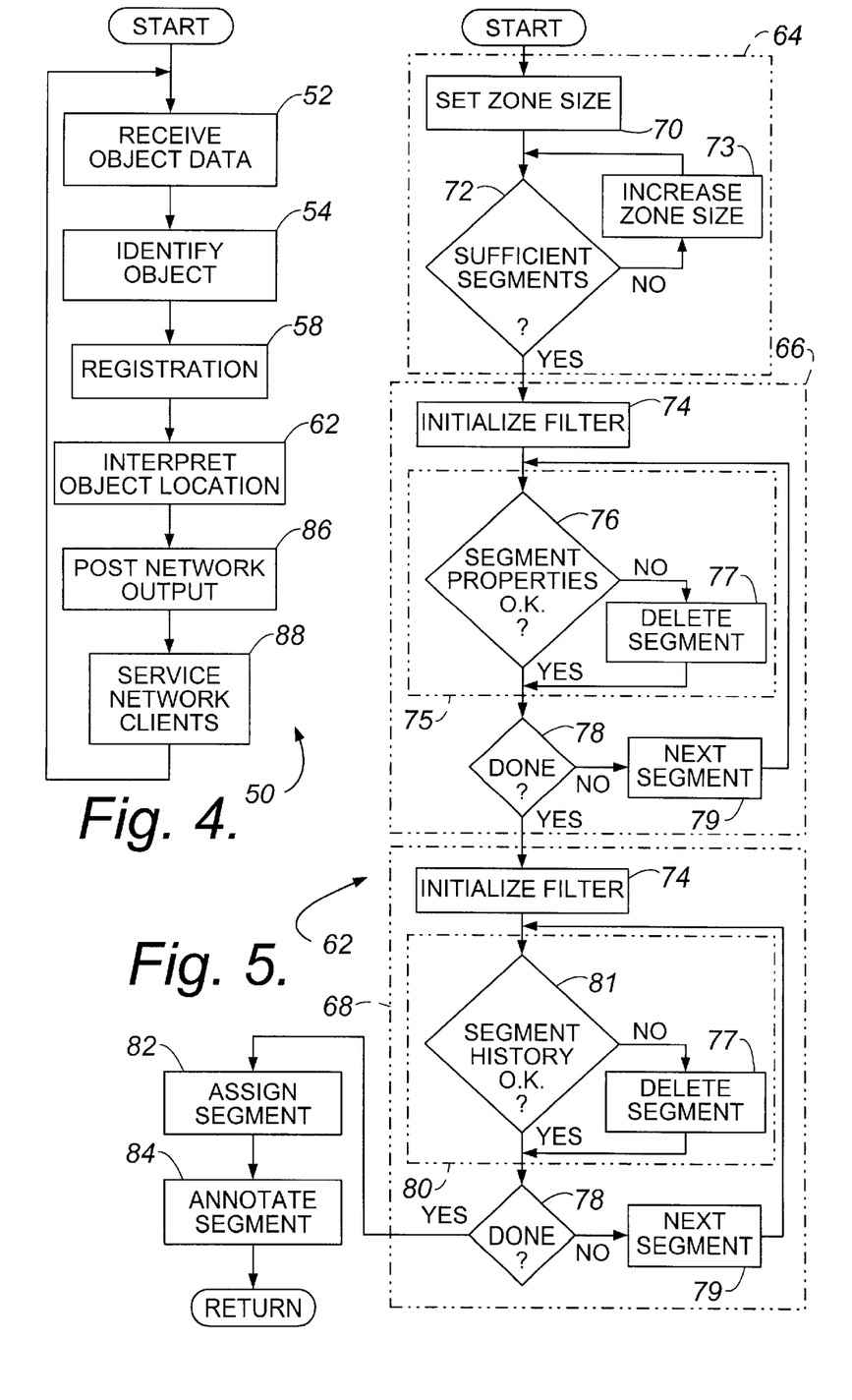
FIG. 4 is a flow diagram of an object tracking process implemented by the system of FIG. 1.
FIG. 5 is a computer flow diagram showing a portion of the process of FIG. 4 in greater detail.

As shown in FIG. 4, an exemplary object-tracking process 50 according to the present invention includes an object data input step 52 wherein target point coordinates of one of the objects 18 are received by the LIS 12 from the wireless communication network 14 together with an identifying data such as a serial number of the corresponding mobile unit 16, and optionally one or more of the time, date, target speed, target direction or heading, and target elevation. The identifying data is examined in an object recognition step 54 for associating an appropriate description of the object 18. A boundary map 56 (see FIG. 3) is accessed in a location registration step 58 using the target point for identifying an appropriate digital map 60 (FIG. 3) of a geographic area that is inclusive of the target point. Next, an interpretation function 62 is performed wherein a description of the object location is generated in terms of reference features of the identified digital map, the reference features being typically defined by street centerline line segments as discussed above.

As shown in FIG. 5, the interpretation function 62 includes a progressive target zone search 64 for identifying a suitable candidate set of the line segments, a network property filter 66 for excluding candidate segments based on physical attributes of reference features represented by those segments, if valid data are available, based on one or more of the velocity of the object 18, the heading of the object (whether these are determined from direct measurement data or derived from a previously recorded target point of the object), the length of the candidate segments, and angular relationships between candidate segments and connecting segments. A travel pattern filter 68 is then activated if at least a prior location of the moving object is available, wherein additional criteria are analyzed for a better match. The travel pattern filter 68 additionally excludes candidate segments based on previous activity of the object 18 such as a last previously identified matching line segment, and one or more previously identified locations of the object. In the target zone search 64, a zone size variable such as a radius from the target point is initialized in an initialize zone step 70 for defining the initial size of a target zone surrounding the target point. Next, a segment number test 72 is performed for determining whether a predetermined number of candidate line segments of the digital map 60 extend into the target zone, in which case control is passed to the network property filter 66; otherwise, the zone variable is increased in an increment zone step 73 and the number test 72 is repeated. The initial search can be set at a radius of 300 ft, for example. If not enough segments are found, the radius can be increased to 500 ft, then to 1000 ft, etc. It will be understood that the expansion does not need to be either of a fixed percentage or a constant increment.

The network property filter 66 includes an initialize filter step 74 wherein a pointer or other means is set for sequentially accessing each of the candidate line segments identified in the target zone search 64. Next, in a segment filter 75 a segment property test 76 is performed for determining whether physical properties of each candidate segment is inconsistent with an identification of the object 18 as being located on that segment. Suitable criteria include speed and direction. If the speed of the object is 65 MPH while a segment is of a residential street and is very short in length, the chance for the object to be moving at that speed on a short residential segment is slim and thus the segment is filtered out. Likewise, if the object is moving northbound and a near segment is a southbound lane of a freeway, then that segment is filtered out in a delete segment step 77. A done test 78 passes control to the travel pattern filter 68 after each segment of the candidate set has been tested, otherwise to a next segment step 79 with a return to the segment property test 76 for sequentially testing the candidate segments.

The travel pattern filter 68 includes a counterpart of the initialize filter step 74 for sequentially accessing each of the remaining candidate line segments. Next, a segment history filter 80 includes a segment history test 81 for determining whether physical properties of candidate segments are inconsistent with an identification of the object 18 as being located on particular segments. The main purpose of this step is to minimize matching errors due to uncertainty. In case two parallel streets exist, both satisfying the network property filter 66, and both are of substantially equal distance from the target point, then the travel pattern filter 68 evaluates the travel pattern based on to the previous target point. For instance, if the previous location of the object is on Street A, and current position could be assigned to either Street A or Street B, then Street A is selected between the two candidates. Likewise, if the previous point is on Street A, and current candidates are Street B and Street C, while Street A is connected to Street B but there is no connection between Street A and Street C, then Street B is selected instead of Street C. The travel pattern filter also includes counterparts of the delete segment step 77, the done test 78, and the next segment step 79.

The interpretation function 62 further includes an assign segment step 82 wherein a matching one of the remaining candidate segments is selected. After network properties and travel patterns are evaluated, the remaining set of candidate segment tends to be small. The object's position is then assigned to the closest segment and the matching point on that segment is determined mathematically. The segment assign step 82 is followed by an annotation step 84 wherein a description of the matching segment and further details such as the speed and direction of the object, the street address and/or distance from a nearby intersection are associated with the object. In the usual case of street map data, the interpretation function 62 identifies the exact location of the object 18 in terms of street, intersection, direction, speed, and any other relevant map information. Thus once the target position is assigned to a segment, the final step of the algorithm is to extend from the assigned point in all directions through connecting (street) segments. The process proceeds from the assigned segment in two directions. The connecting locations can be cross-street intersections, street ends, or continuation segments. If the first extended point is not at a cross-street (or wye) intersection, then the process loops through the next connecting segments until such an intersecting segment is found. At the end of this process, the Lat/Long (X-Y) of a point location has been converted into information based on relevant landmarks such as street intersections. As a result of the automated interpretation, the location of any object can be represented in any, or all, of the following three forms without any need of human intervention: a digital map display as an image file, a text description of the location in terms of street information, and a voice file of the location information in terms of street information. One suitable form of such information is "Harbor Blvd. 38 MPH, North bound, between McArthur and Warner, in Santa Ana". Alternatively, if there is a need for address estimation, then the method can apply a linear interpretation of the assigned point to provide "1234 Harbor Blvd. in Santa Ana".

As further shown in FIG. 4, the tracking process 50 also includes a network posting step 86 wherein the tracking data is compiled and stored in the output database 48, properly formatted for transmission over the data network 28 in a plurality of forms suitable for retrieval by requesting ones of the network terminals 30. Following the network posting step 86, a service function 88 is performed for monitoring and responding to requests from the network terminals 30, after which control is transferred to the data input step 52 for continuing the tracking process 50 in real-time.

Figure 6:
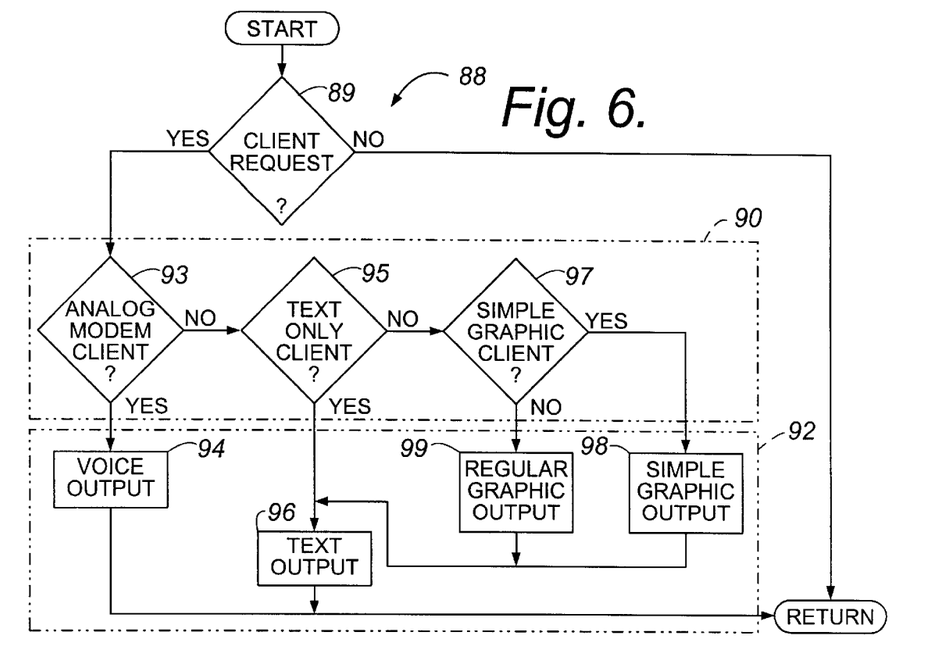
FIG. 6 is a computer flow diagram showing further details of a network service portion of the process of FIG. 5.

As shown in FIG. 6, the service function 88 includes a test client step 89 for determining whether an authorized network terminal 30 is requesting tracking information relative to one of the objects 18, in which case the display and/or audio output capabilities of the terminal 30 are ascertained in a client identification step 90, and the interpreted object location is transmitted to the terminal 30 in a tracking output step 92. The client identification step 90 tests for the source of the request (where it comes from, from voice modem lines or from network). If the request comes from voice modem lines, then the response must be voice messages and thus a program device translates the location information about the object into a voice message and then send out to the requesting device in voice. A device suitable for performing the text to voice translation is available as ViaVoice from IBM. If the request comes from a data network, the LIS 12 ascertains the protocol, whether TCP/IP or WAP (or any other protocol that may become commonly adopted in the future) from header information that forms a part of the protocol. In the case of no requesting terminal 30, the service function 88 is terminated for returning program control to the data input step 52 of the tracking process 50 as described above. In the exemplary implementation of the service function shown in FIG. 6, the client identification step 90 first performs an analog test 93 for determining whether the request comes from a voice modem or digital data network. If voice modem, then the tracking output step 92 executes an analog voice output step 94. Otherwise, a text only test 95 determines a corresponding limitation of the client terminal, in which case a text output step 96 transmits the interpreted tracking data only as text output. Otherwise, a graphics test determined whether the client is registered to a simple graphical device, in which case a simplified image set is sent in a simple graphic output step 98, but if the client has enhanced capability a regular image set is sent in a regular graphic output step 99. Thus appropriate portions of the posted tracking data are fed to the requesting network terminal 30 in the tracking output step 92. In cases wherein the requesting terminal 30 is one of the thin client receivers 32, limited portions only of the tracking data are transmitted. For example, if the thin client receiver 32 has image display capability, a map showing the location of the object can be displayed on the screen. If the thin client can only display text messages, then the location information will be displayed as the text description. If the thin client can only receive analog messages, then an analog voice message will convey the same location information as the text description. It will be understood that the present invention also contemplates digital voice output to digital cell phones by appropriate extension of the above-described service function 88.

For other network terminals 30, the service function 88 has multiple options for users to subscribe to. The minimum level is a simple text file as employed in e-mail messages. A web-enabled digital cellular phone accessing a web site can directly get the object location in the form of a text file. This is through the presently operational WAP protocol. However, if the requesting terminal 30 is using TCP/IP and has better than text only output, then the user is given options for (1) text only, (2) text plus simple graphics, or (3) both. This can be set at the time of the request as shown in FIG. 6, or previously when the user subscribes to the service. The service function 88 is preferably implemented for sending either simple text only, simple graphics only, or a high resolution image file (which may combine text and graphics) depending on the protocol and subscription channel. The service function 88 may also output multiple files of text plus image, if requested. It is currently disadvantageous to send files in forms not useable by the requesting terminal 30; thus it is preferable not to send data in more forms than what is asked for in view of the costs involved. However, further technology advances in network and wireless communication may make it practical to allow output in all possible forms, the receiving device displaying only those forms that are supported thereby.

Preferably the thin client receivers 32 are not required to have any plug-in tools or installation of any other map interpretation programs or mapping tools in order to receive and present the transmitted tracking data. Plug-in tools include programs that can be downloaded from the Internet or that can be installed by other means to process data, translate messages, or display maps. It will be understood that such plug-in tools can be utilized, if present in particular ones of the thin client receivers 32.

The program memory 44 has loadable therein a tracking program 100 that contains computer instructions for implementing the tracking process 50, and digital to analog conversion utilities (not shown) for implementing analog voice output functions of the process 50. It will be understood that the tracking program 100 can be provided in any suitable computer-readable form, including fixed media such as magnetic disks and optical disks (CDs), or downloaded over the data communication network 28.

Figure 7:
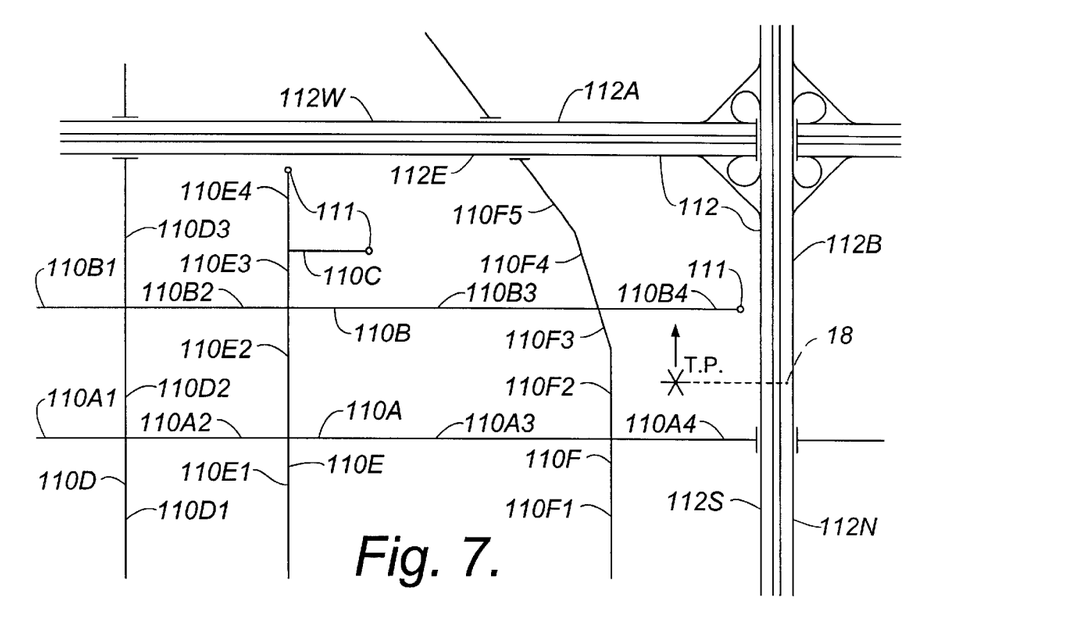
FIG. 7 is a graphical representation of a digital map being employed by the system of FIG. 1 and depicting an object being tracked.

FIG. 7 graphically depicts a portion of an exemplary digital map 60 with the target point of an object 18 being tracked indicated by an asterisk within a lower right hand block of the diagram. The map depicts map segments representing a number of surface (residential) streets 110 and an intersecting pair of divided highways or freeways, designated 112A and 112B. More particularly, the freeway 112A has eastbound lanes 112E and westbound lanes 112W, and the freeway 112B has northbound lanes 112N and southbound lanes 112S, the portions thereof in FIG. 7 being straight and being thus defined by corresponding centerline segments of the digital map 60. The residential streets include respective east-west streets 110A, 110B, and 110C, and respective north-south streets 110D, 110E, and 110F, the streets 110B, 110C, and 110E being terminated by respective dead-ends 111. More specifically, each of the residential streets 110 may include multiple segments that extend between intersections with other streets and between intersecting segments of the same street. For example, the north-south street 110E includes a segment 110E1 that extends southerly from the east-west street 110A, a segment 110E2 extending between the streets 110A and 110B, a segment 110E3 extending between the streets 110B and 110C, and a segment 110E4 extending between the street 110C and the dead end 111. The street 110F similarly has a segment 110F1 extending south of the street 110A and a segment 110F2 extending north therefrom. However, the street 110F is generally curved, being further represented by a segment 110F3 extending generally NNW to the street 110B, a segment 110F4 continuing NNW to and intersecting with a segment 110F5 that extends NW under and beyond the freeway 112A. Other segments 110A1, 110A2, 110A3, 110A4, 110B1, 110B2, 110B3, 110B4, 110D1, 110D2, and 110D3 are designated in like manner in FIG. 7. It will be understood that the freeways 112 are contemplated to be similarly defined by line segments, the lanes 112N, 112S, 112E, and 112W being treated as corresponding segments for simplicity.

There are several candidate segments surrounding the target point, namely 110A4, 110B4, 110F2, 110F3, 112S, and 112N. The heading information indicates that the object 18 is moving north bound, thus the two east-west local streets 110A and 110B are ruled out. The south bound lane 112S of the freeway is also ruled out due to the heading, even though it is the closest segment. The speed of the object, say, 65 MPH, then rules out the local street 110F to the west of the target point, even though this segment is closer than the north bound lane of the freeway. As the north bound lane is the only best possible candidate, the point location on that north bound lane closest to the target point is identified and used as the solution location of the object 18. It is also possible that the object 18 is a vehicle that is speeding on residential streets. In such case the segment property test 76 is particularly advantageous, because residential streets tend to be short and sometimes meandering. When the direction of high-speed travel does not follow a nearby freeway the interpretation is restored to residential streets, and in subsequent cycles wherein the vehicle may travel parallel to the freeway, the segment history test 81 retains the selection of the residential street. In other words, the speed, direction, and path are utilized in combination for particularly effective identification of a most likely street location of the object 18.

In the position shown in FIG. 7, if the speed information indicates the object 18 not moving, then the heading information is no longer relevant. Instead of matching the target point to the most likely street location, the method calculates distances from two or more nearby segments and generates a report of the location of the object 18 as at the target point relative to the nearby segments. For example, the result could be "50 ft west of FWY 55 and 60 ft north of Lincoln Ave." Thus when reporting an object not on a street, the system 10 calculates the distance of that object from the nearest street segment. In another example, the report can state, "120 ft south of Highway 91 and 60 ft east of Green River Road". Once the near roads are found, it is also contemplated to calculate the distance between the object location and the two nearest segments. This function is especially useful for reporting the location information for a stationary object such as a vehicle that has fallen off of a road.

Figure 8:
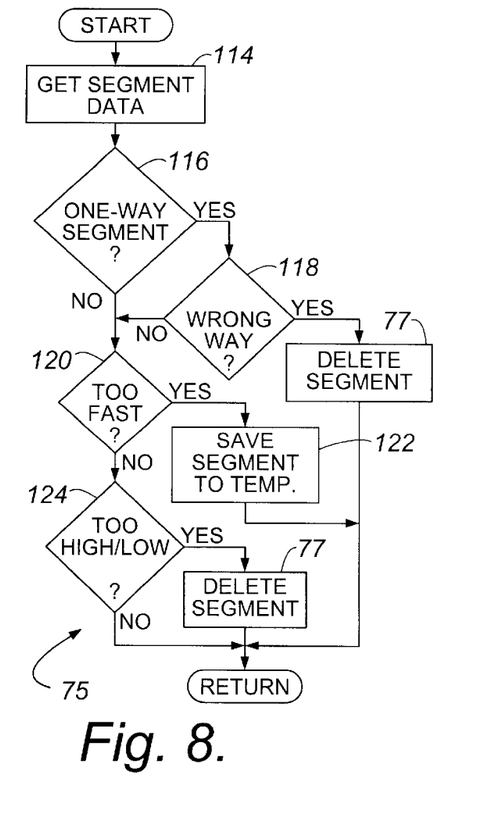
FIG. 8 is a computer flow diagram of a segment property filter portion of the process portion of FIG. 5.

FIG. 8 shows an exemplary implementation of the segment property filter 75 of FIG. 5. Available parameters of the segment are obtained from the digital map 60 in an access segment step 114; then, a one-way test 116 determines whether the segment is a one-way street. If so, a wrong-way test 118 determines whether the one-way direction of the segment is inconsistent with the heading of the object 18, in which case the segment is eliminated from the candidate segments in the delete segment step 77. Otherwise, a speed test 120 compares the velocity of the object 18 with the speed limit of the segment, and the segment is removed as a candidate if the speed limit is exceeded by a predetermined amount. More particularly, a reserve segment step 122 temporarily saves the segment for further consideration, in the assign segment step 82, of special circumstances such as reckless driving on residential streets as described below. Finally, an elevation test 124 rejects a remaining candidate segment, if elevation information is available for both the segment and the object 18, when the difference in elevation exceeds a predetermined amount, control being passed to the delete segment step 77.

Figure 9:
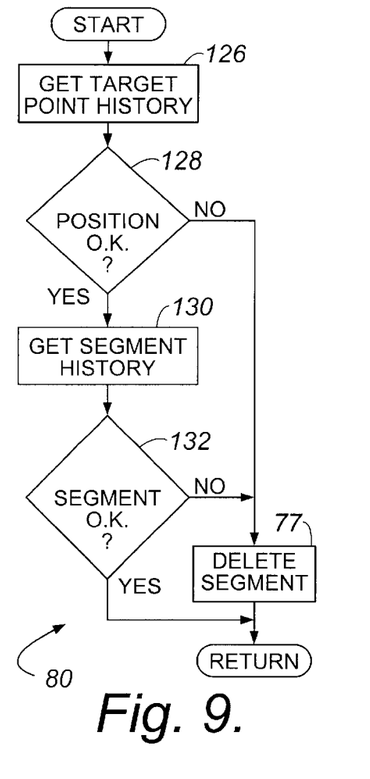
FIG. 9 is a computer flow diagram of a segment history filter portion of the process portion FIG. 5.

FIG. 9 shows an exemplary embodiment of the segment history filter 80 of FIG. 5. A predetermined number of most recent target point locations are obtained in a get target point history step 126; then movement of the object 18 is then checked against properties of the street segment in a position test step 128. If the position history is inconsistent with the segment properties, control is passed to the counterpart delete segment step 77, with subsequent termination of the filter 80 for that segment, Otherwise, a predetermined number of most recently assigned segments is obtained in a get segment history step 130, followed by a segment test 132 that determines whether the current candidate segment can logically follow the previous assigned segments. If not, control is passed to the counterpart delete segment step 77; otherwise, the filter 80 terminates without rejecting the candidate segment. Thus the path of the object and the path of streets must match in order to retain the candidate segment.

Figure 10:
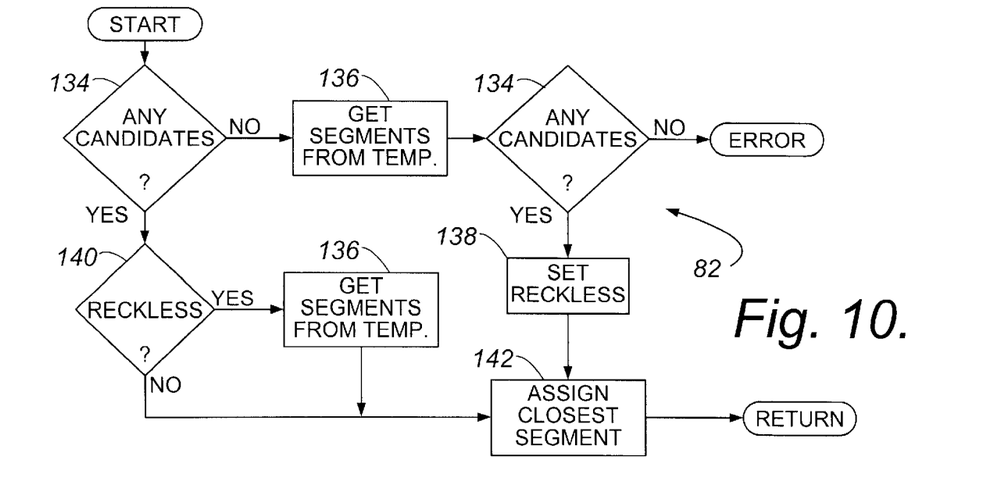
FIG. 10 is a computer flow diagram showing details of a network service portion of the process of FIG. 4.

FIG. 10 shows an exemplary embodiment of the assign segment step 82 of FIG. 5. A candidate test 134 determines whether there are any remaining candidate segments. If not, a get reserve segments step 136 retrieves any that were saved in the reserve segment step 122 (see FIG. 8) of the segment property filter 75 (for the current target point), and the test candidate step is repeated, this time passing control to a set reckless step 138 to set a corresponding flag in the case of only reserve segments being available from the initial set of candidate segments. In the unlikely event that there is not even a reserve segment, control is passed to an error condition for special handling, such as by returning control to the target zone search 64 with an enlarged target region or with an increased number of required segments. From an initial affirmative result of the candidate test 134, a reckless test 140 determines whether the reckless flag had previously been set, in which case a counterpart of the get reserve segments step 138 adds the reserved segments to the regularly retained ones. Following the set reckless step 138, the counterpart get reserve segments step 136, or a negative result of the reckless test 140, the closest presently retained segment is assigned to the target point in an assign closest step 142.

Thus the present invention in preferred forms provides a number of advantages over existing systems for tracking objects. For example, the tracking system 10 does not require parcel maps, using instead the widely available street centerline files such as US Census Bureau's TIGER/Line file. The processing of object information is completely automated. It does not require any operator to look at a map display and generate object information. The automated interpretation of the object location is made particularly efficient for real-time operation by programmed steps that reduce to a small number the map segments to be searched. The result is particularly accurate due to the evaluation of network properties of mapped streets and the travel pattern of objects tracked. Because the system 10 generates information based on street network features, it can identify cross streets and provide meaningful information for users. Another important feature of the present invention is how the information is conveyed to the client. First, if the client is an analog cellular phone, the object location is conveyed in terms of (street network) reference features in a voice message. If the client is a web enabled digital cellular phone, the system 10 conveys the location information as a text file. Third, if the client is a hand-held computer with limited capability of graphical display, the system may convey both a text file and a simplified map. Fourth, if the client is a computer with good map display capability, then the information conveyed can be both a text file and a detailed map. In any case, a text file in the digital form or the analog form is always available.

There are numerous applications of the present invention. For example, a worried parent can use a cellular phone to look at the location of his/her teenage child anytime anywhere. A police chief can use a hand held computer look at the movement of an officer working on a tactical assignment. A tourist can find from the cellular phone his/her pet lost in a theme park. A fleet manager can use a mobile data terminal identify which truck is closest to a customer that requires immediate package delivery. All of these applications can be satisfied with real-time location information that can be received with any thin client reciever without the need of any involvement of an operator at a host terminal in interpreting location data.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A system for tracking objects in an environment having geographical reference features, comprising:
    (a) a database for storing reference data as line segments corresponding to coordinate locations along the reference features, the database being sectioned by geographic unit, the sections comprising digital street maps;
    (b) means for receiving object data including respective target points as coordinate locations of the objects;
    (c) a computer having access to the database and to the object data, the computer being programmed for:
        (i) generating an interpreted location of each of the objects in terms relative to automatically selected ones of the reference features;
        (ii) determining geographic units containing the coordinate locations of the objects, at least some of the interpreted locations being in terms of a closest street, an intersecting street, and a direction on the closest street from the intersecting street, the determination of the closest street being qualified to exclude streets that are inconsistent with a velocity and heading of the object; and
        (iii) for each of the objects, accessing a corresponding section of the database; and
    (d) means for temporarily saving segments of excluded streets as reserve segments, means for determining a likelihood of abnormal object movement, and means for restoring the reserve segments as candidate segments following a determination of abnormal object movement.

2. The system of claim 1, wherein the means for receiving object data comprises a plurality of mobile units for connection to respective ones of the objects, each of the mobile units having means for receiving signals from an external location system and generating the object data, and a wireless transmitter for transmitting the object data over a wireless communication network for access by the computer.

3. The system of claim 2, wherein the means for receiving signals comprises a GPS receiver.

4. The system of claim 3, wherein the object data further includes a target altitude.

5. The system of claim 2, wherein the means for receiving signals comprises a terrestrial position receiver having access to a terrestrial location system.

6. The system of claim 2, wherein the object data further includes object identification.

7. The system of claim 2, wherein the object data further includes a target velocity.

8. The system of claim 2, wherein the object data further includes a target heading.

9. The system of claim 1, wherein at least some of the interpreted locations further comprise a closest location along the closest street.

10. The system of claim 9, wherein at least some of the interpreted locations further comprise a heading and distance from the closest location.

11. The system of claim 1, wherein at least one of the velocity and heading of the object is determined based on separately received target points of the object and a time interval between the target points.

12. The system of claim 1, wherein the means for determining abnormal object movement comprises means for determining that, for any target point, there are only reserve segments.

13. A method for tracking objects in an environment having geographical reference features in terms relative to automatically selected ones of the reference features, comprising the steps of:

(a) providing a database for storing reference data as line segments corresponding to coordinate locations along the reference features;

(b) receiving object data including a target point as a coordinate location of one of the objects;

(c) defining an initial target zone proximate the target point;

(d) determining whether a predetermined number of the line segments extend within the target zone;

(e) in the absence of the predetermined number, enlarging the target zone and repeating step (d);

(f) identifying as candidate segments the line segments extending within the target zone;

(g) selecting a matching segment from the candidate segments, qualified to exclude segments that are inconsistent with a velocity and heading of the object;

(h) calculating a matching point on the matching segment, the matching point being in closest proximity to the object location;

(i) interpreting the object location in terms of the matching segment and the matching point;

(j) temporarily saving segments of excluded streets as reserve segments;

(k) determining a likelihood of abnormal object movement; and (l) restoring the reserve segments as candidate segments following a determination of abnormal object movement.

14. The method of claim 13, wherein the selecting of the matching segment comprises exclusion of segments from the candidate segments based on one or more of physical attributes of the reference features represented by the line segments, velocity of the object, heading of the object, a last previously identified matching segment, and previously identified location(s) of the object.

15. The method of claim 14, wherein the selecting of the matching segment further comprises determining a closest segment from remaining candidate segments.

16. The method of claim 13, further comprising determining at least one of the velocity and heading of the object based on separately received target points of the object and a time interval between the target points.

17. The method of claim 13, wherein the determination of abnormal object movement includes determining that, for any target point, there are only reserve segments.

18. The method of claim 13, further comprising determining a boundary feature from which to access the matching point, including:

(a) determining whether the matching segment terminates in an intersection, an end, and/or a continuation segment;

(b) for terminations exclusive of intersections and ends, substituting the continuation segment and repeating step (a); and (c) including the end and intersection(s) in the interpreting of the object location.

19. The method of claim 13, further comprising:

(a) monitoring a data communication network;

(b) receiving an object location request from a client of the data communication network;

(c) automatically identifying a data output capability of the client;

(d) automatically selecting an output format for the object location interpretation, the output format being consistent with the data output capability of the client; and (e) transmitting the location interpretation in the selected output format.

20. The method of claim 13, wherein the database is sectioned by geographic unit, the method further comprising determining geographic units containing the coordinate locations of the objects and, for each of the objects, accessing a corresponding section of the database.

21. The method of claim 13, wherein the database sections comprise digital street maps, the method further comprising determining at least some of the interpreted locations in terms of a closest street, an intersecting street, and a direction on the closest street from the intersecting street.

22. A computer program embodied on a computer-readable medium and having code segments for tracking objects in an environment having geographical reference features in terms relative to automatically selected ones of the reference features, the code segments comprising instructions for executing the steps of.

(a) providing a database for storing reference data as line segments corresponding to coordinate locations along the reference features;

(b) receiving object data including a target point as a coordinate location of one of the objects;

(c) defining an initial target zone proximate the target point;

(d) determining whether a predetermined number of the line segments extend within the target zone;

(e) in the absence of the predetermined number, enlarging the target zone and repeating step (d);

(f) identifying as candidate segments the line segments extending within the target zone;

(g) selecting a matching segment from the candidate segments, qualified to exclude segments that are inconsistent with a velocity and heading of the object;

(h) calculating a matching point on the matching segment, the matching point being in closest proximity to the object location;

(i) interpreting the object location in terms of the matching segment and the matching point;

(j) temporarily saving segments of excluded streets as reserve segments;

(k) determining a likelihood of abnormal object movement; and (l) restoring the reserve segments as candidate segments following a determination of abnormal object movement.

* * * * *